(12) United States Patent
Huffer et al.

(10) Patent No.: US 12,226,688 B2
(45) Date of Patent: *Feb. 18, 2025

(54) ERGONOMICALLY CORRECT GAME CONTROLLER

(71) Applicant: Hit Box, L.L.C., Henderson, NV (US)

(72) Inventors: Dustin Huffer, Henderson, NV (US); Shawn Huffer, Henderson, NV (US)

(73) Assignee: Hit Box, L.L.C., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,151

(22) Filed: Oct. 20, 2023

(65) Prior Publication Data
US 2024/0042311 A1  Feb. 8, 2024

Related U.S. Application Data

(63) Continuation of application No. 17/844,276, filed on Jun. 20, 2022, now Pat. No. 11,826,640, which is a continuation of application No. 16/909,174, filed on Jun. 23, 2020, now Pat. No. 11,369,867, which is a continuation of application No. 16/014,794, filed on Jun. 21, 2018, now Pat. No. 10,722,787, which is a continuation of application No. 13/312,847, filed on Dec. 6, 2011, now Pat. No. 10,022,623.

(60) Provisional application No. 61/420,245, filed on Dec. 6, 2010.

(51) Int. Cl.
*A63F 13/24* (2014.01)
*A63F 13/235* (2014.01)

(52) U.S. Cl.
CPC ............ *A63F 13/24* (2014.09); *A63F 13/235* (2014.09); *A63F 2300/1018* (2013.01); *A63F 2300/1031* (2013.01); *A63F 2300/1043* (2013.01)

(58) Field of Classification Search
None
See application file for complete search history.

(56) References Cited

U.S. PATENT DOCUMENTS

| | | | | |
|---|---|---|---|---|
| 5,087,910 | A * | 2/1992 | Guyot-Sionnest | H01H 13/807 345/169 |
| 5,644,113 | A * | 7/1997 | Date | A63F 13/22 200/6 A |
| 5,923,317 | A * | 7/1999 | Sayler | A63F 13/285 345/156 |
| 2001/0003713 | A1* | 6/2001 | Willner | G06F 3/0219 348/E5.103 |
| 2007/0060393 | A1* | 3/2007 | Wu | A63F 13/24 463/47 |

* cited by examiner

*Primary Examiner* — Jason T Yen
(74) *Attorney, Agent, or Firm* — DICKINSON WRIGHT PLLC

(57) ABSTRACT

A hand operated game controller for controlling a game console. Multiple push buttons are arranged on the surface of the game controller. The push buttons are placed in an arrangement that approximately matches the natural position of the fingers of the user's hands. As the user presses the buttons, control signals are sent from the buttons to the game console via wiring.

20 Claims, 15 Drawing Sheets

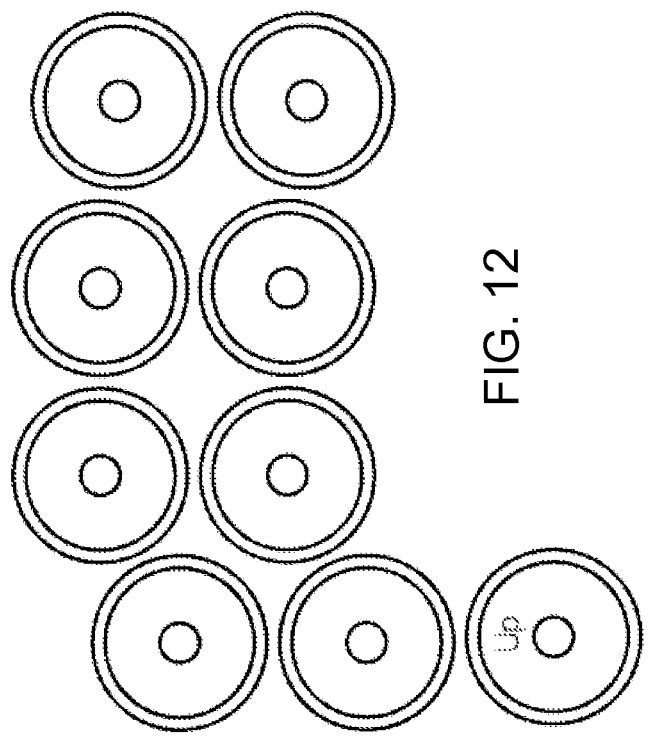
FIG. 12
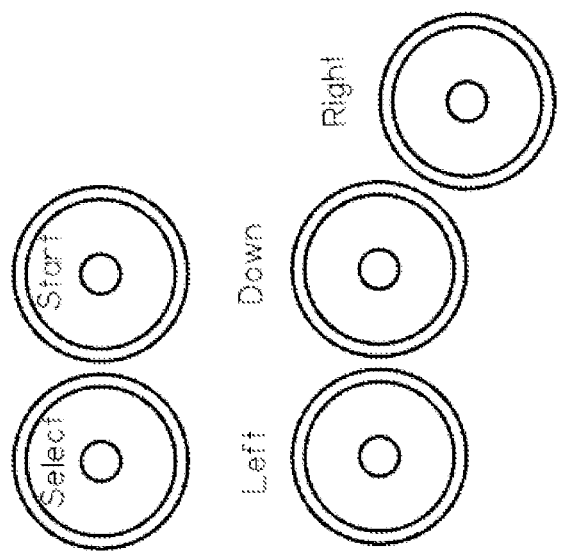

US 12,226,688 B2

ERGONOMICALLY CORRECT GAME CONTROLLER

CROSS-REFERENCE TO RELATED APPLICATIONS

This application claims priority to U.S. patent application Ser. No. 17/844,276, filed Jun. 20, 2022, which claims priority to U.S. patent application Ser. No. 16/909,174, filed Jun. 23, 2020, now issued as U.S. Pat. No. 11,369,867, which claims priority to U.S. patent application Ser. No. 16/014,794, filed Jun. 21, 2018, now issued as U.S. Pat. No. 10,722,787, which claims priority to U.S. patent application Ser. No. 13/312,847, filed Dec. 6, 2011, now issued as U.S. Pat. No. 10,022,623, which claims priority to U.S. application Ser. No. 61/420,245, filed Dec. 6, 2010.

BACKGROUND OF THE INVENTION

1. Field of the Invention

The present invention relates to electronic game consoles and, in particular, to controllers for electronic game consoles.

2. Related Art

Home video game systems are an extremely popular activity around the world. In a typical arrangement, a user operates a controller having a joystick and buttons and that is connected to a game console to control action on a monitor screen, such as the screen of a television set. While each gaming platform has its own specific design, all tend to utilize a joystick/push button arrangement. Unfortunately, the prior art placement of the buttons and utilization of the joystick is not conducive to the most efficient play. The human hand is shaped in a very specific manner with fingers positioned also in a specific manner. Prior art controllers are not designed to take advantage of the natural features of a human hand.

FIG. 1 shows a prior art Sony Playstation® Controller. Playstation® is a registered trademark of the Sony Computer Entertainment, Inc. The control buttons are labeled in the figure as shown. Buttons 40 control the left, right, up and down movement of a character across the screen. Buttons 50 control certain actions of the character. For example the triangle might control a high punch, the circle might control a low punch, a triangle might control a high kick, and an "X" might control a low kick. Buttons 60 (L1 and L2) can be configured to control various combat actions. Buttons 70 (R1 and R2) are similarly configured to control other combat actions.

What is needed is a better game controller.

SUMMARY OF THE INVENTION

The present invention provides a hand operated game controller for controlling a game console. Multiple push buttons are arranged on the surface of the game controller. The push buttons are placed in an arrangement that approximately matches the natural position of the fingers of the user's hands. As the user presses the buttons, control signals are sent from the buttons to the game console via wiring.

BRIEF DESCRIPTION OF THE DRAWINGS

FIGS. 12-20 show multiple embodiments of the invention.

DETAILED DESCRIPTION OF THE EMBODIMENTS

The present invention is an alternative to traditional gaming controllers to provide greater speed and accuracy in the fighting game genre. The present invention recognizes that eliminating the joystick method and utilizing an all-push-button design operated by the fingertips yields greater game efficiency in an ergonomic fashion. Hence, a significant distinction of the present invention from "arcade joysticks" is the removal of the joystick entirely and replacing it with four arcade-quality directional pushbuttons. In doing so travel time and accidental inputs are near-eliminated. Game users enjoy superior control and ease of complex movements.

Figure 1:
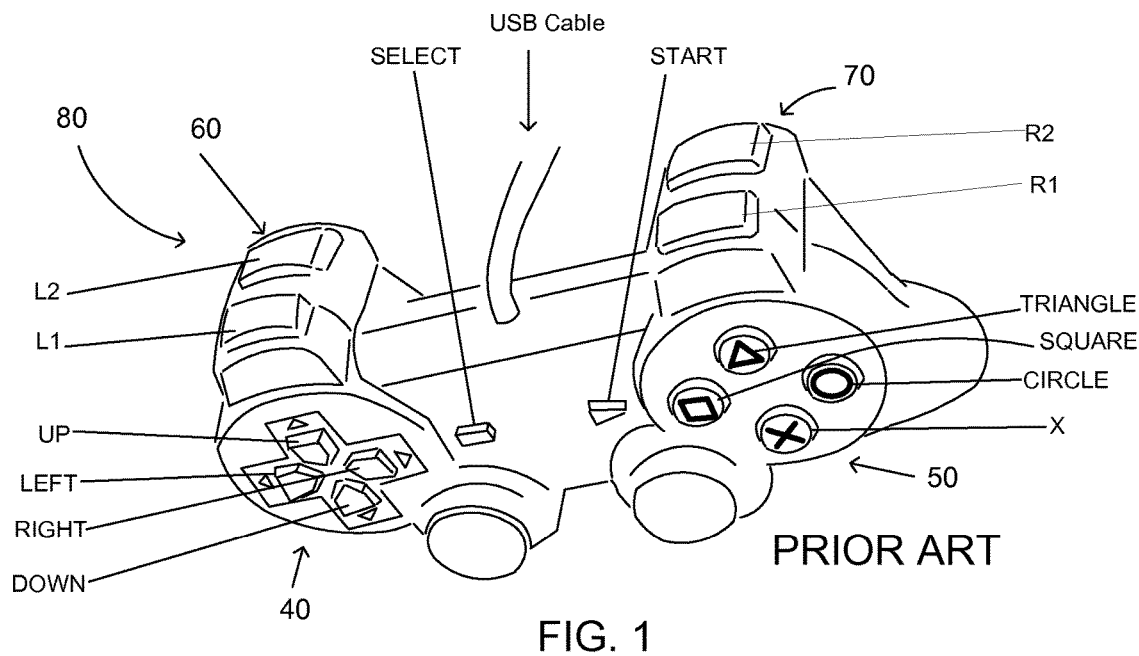
FIG. 1 shows a prior art game controller.
Figure 2:
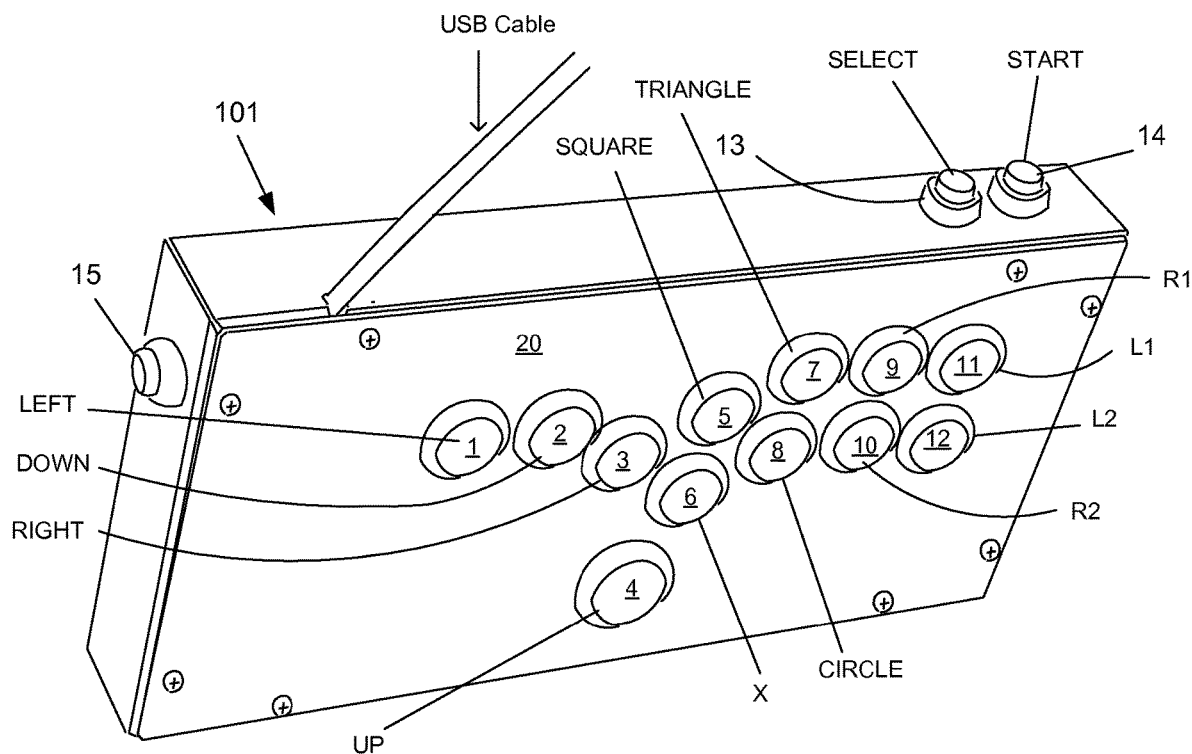
FIG. 2 shows an embodiment of the invention.

FIG. 1 shows a prior art Sony Playstation® Controller 80. The control buttons are labeled in the figure as shown. The button placement, however, is arbitrary and does not logically conform to the natural contours of a human hand. FIG. 2 shows a box shaped controller 101. The buttons have been placed on backing 20 as shown. In the embodiment shown, buttons 1-4 correspond to movement buttons 40 (FIG. 1) and buttons 5-14 correspond to function buttons 50, 60 and 70 (FIG. 1) Button placement has been carefully considered so that it matches the natural contour and shape of the human hand. In this manner, a user can more precisely control the game action. This is very important for competitive garners who are striving to achieve the highest possible score. It is much more natural to play a computer game if the button placement matches the position of the user's fingers.

Figure 3:
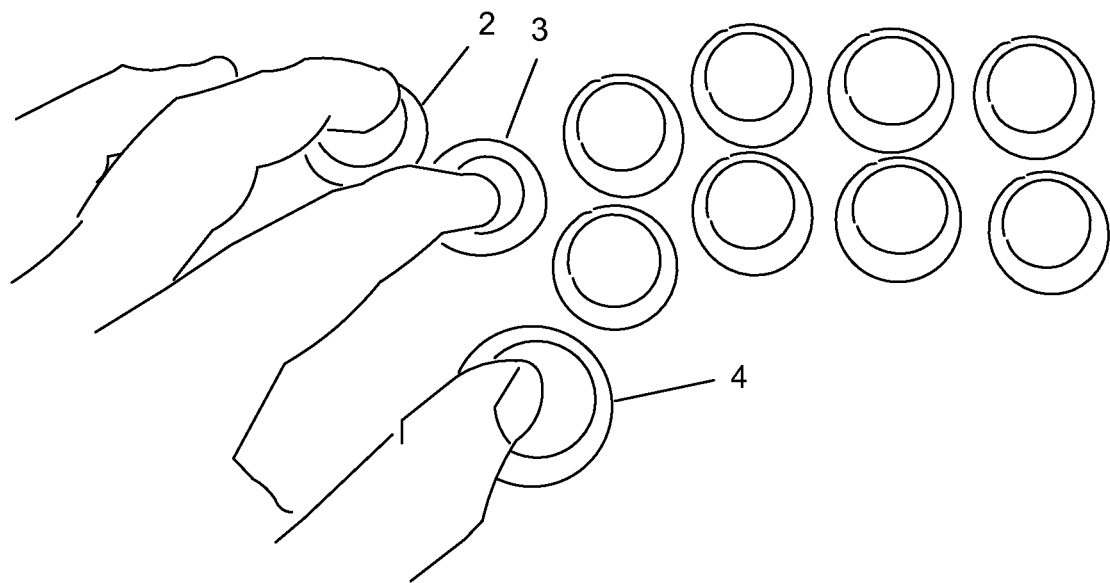
FIGS. 3 and 4 show a user operating an embodiment of the invention.
Figure 4:
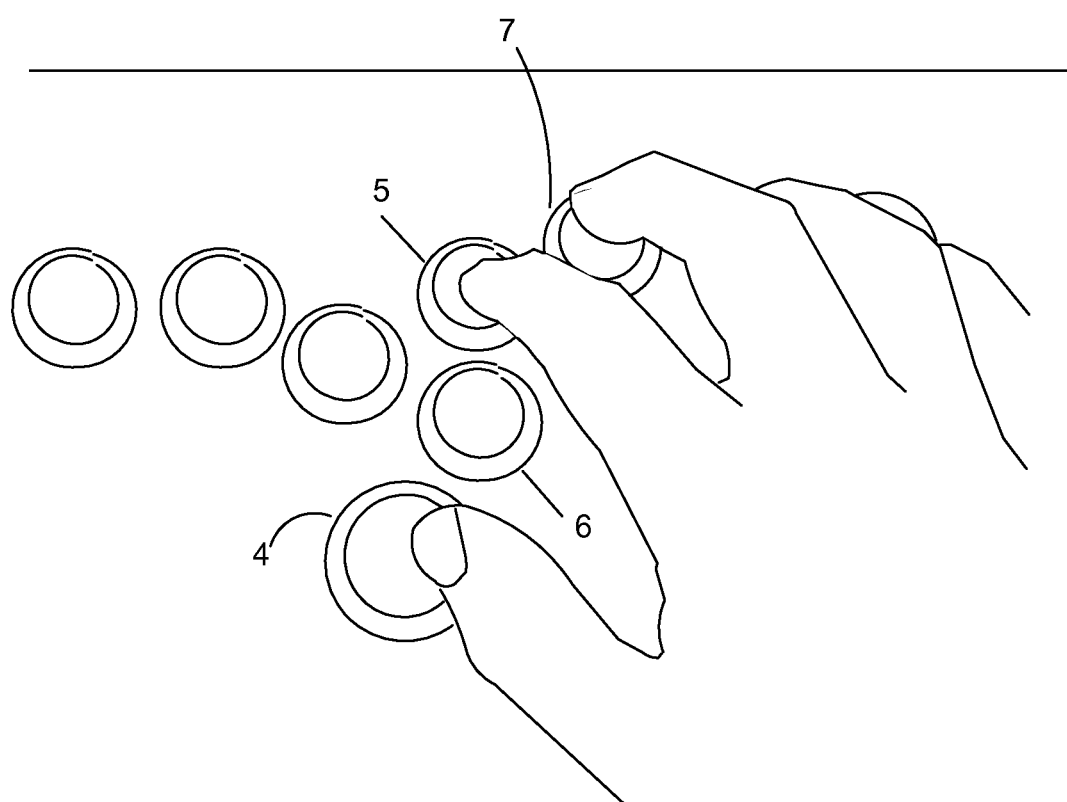

FIGS. 3 and 4 give a very good illustration of the user's hands and fingers appropriately positioned over the buttons of the embodiment shown in FIG. 2. Specifically, in FIG. 3, the left hand is positioned to control the left, right, up and down motion of a character in the game. In FIG. 4, the right hand is appropriately positioned to control fighting movements and other special motions and actions. It should be noted that the right or left thumb can equally reach "up" button 4.

Figure 5:
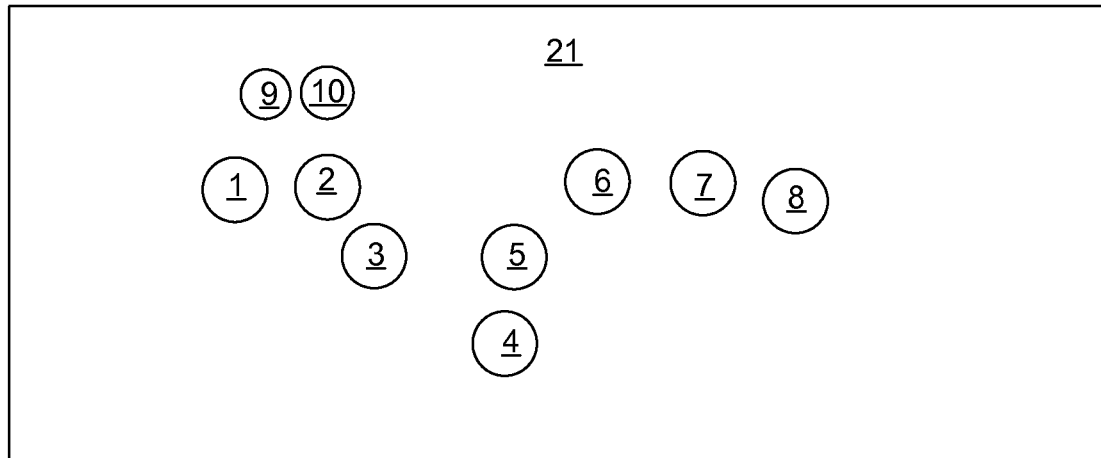
FIGS. 5-9 show multiple embodiments of the invention.
Figure 6:
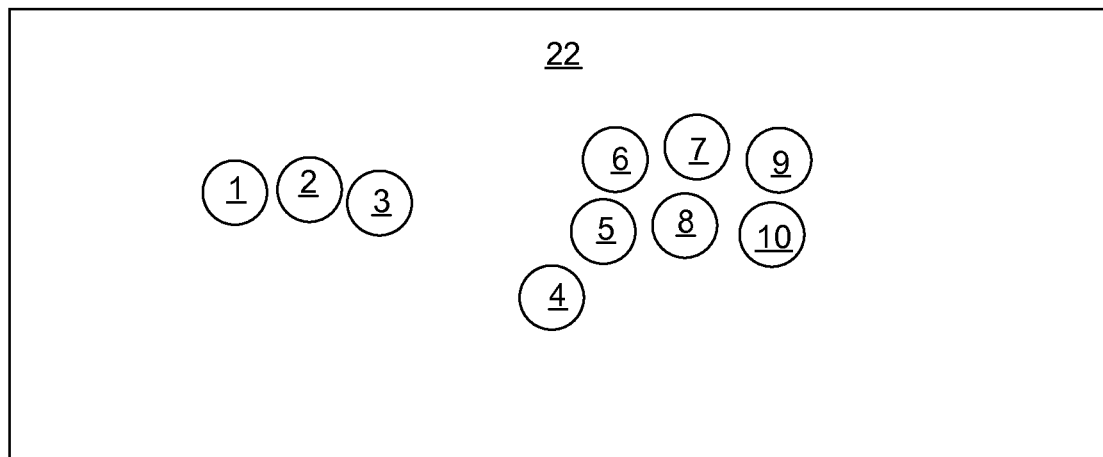
Figure 7:
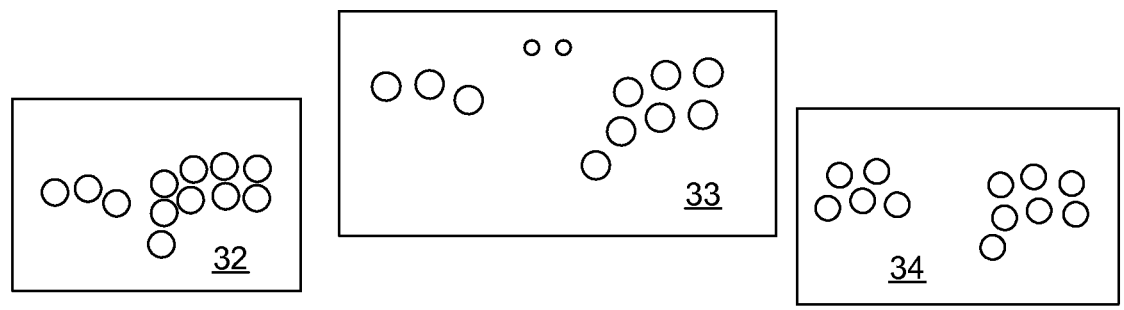
Figure 7:
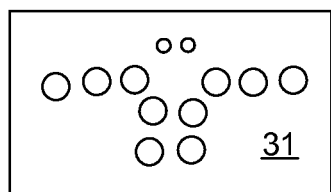
Figure 8:
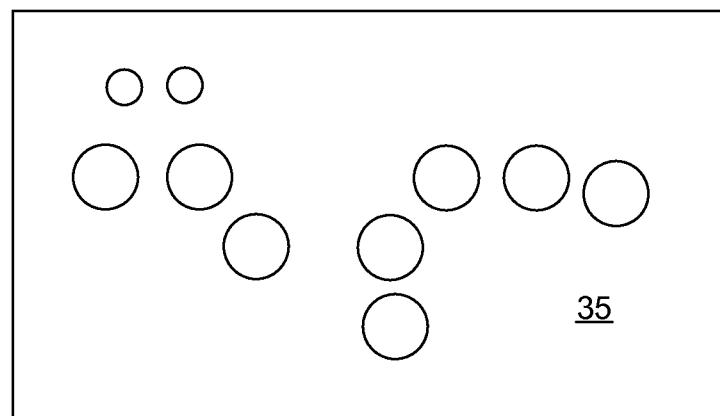

It should be understood that the specific placement of buttons can be modified as desired. The important consideration is that the buttons are placed so that the fingers of the hand can naturally reach the buttons with minimum effort, as shown in the figures. FIGS. 2-4 show one positioning of buttons 1-15. It should be noted that the exact positioning, size and amount of buttons can be modified. It is preferable, however, that the position of the buttons are such that they conform to the natural contour and shape of the user's hand. For example, FIG. 5 shows controller 21 with buttons placed as shown. FIG. 6 shows controller 22 with buttons placed in an alternative style. FIG. 7 shows controllers 31-34 with buttons positioned as shown. FIG. 8 shows controller 35 with buttons positioned as shown.

Figure 9:
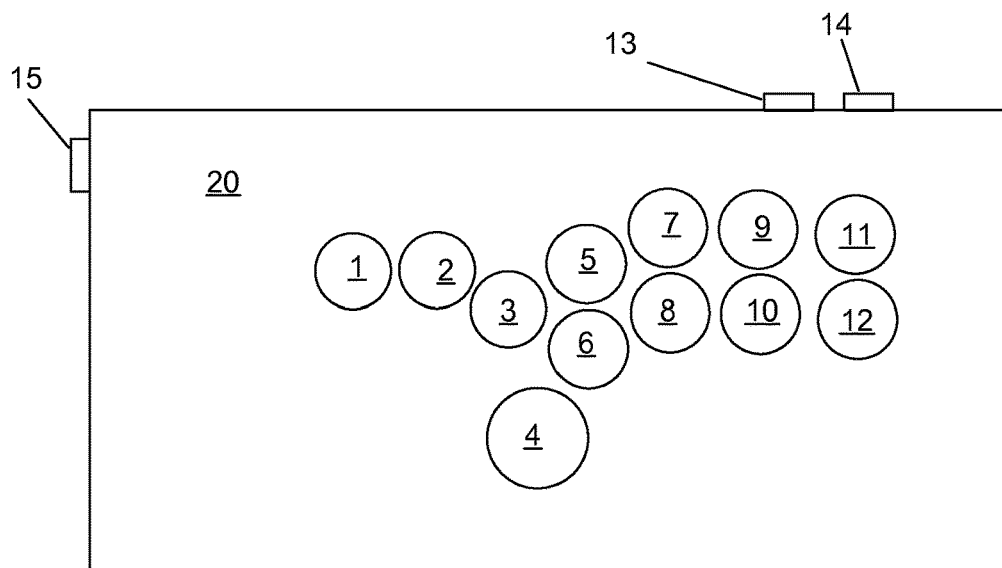
Figure 10:
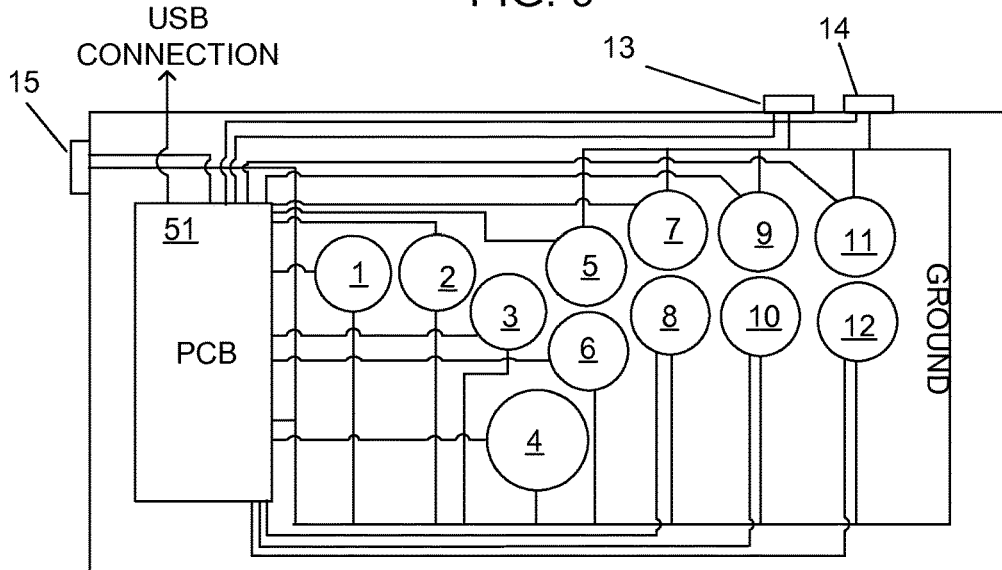
FIGS. 10-11 show electrical connectivity.
Figure 11:
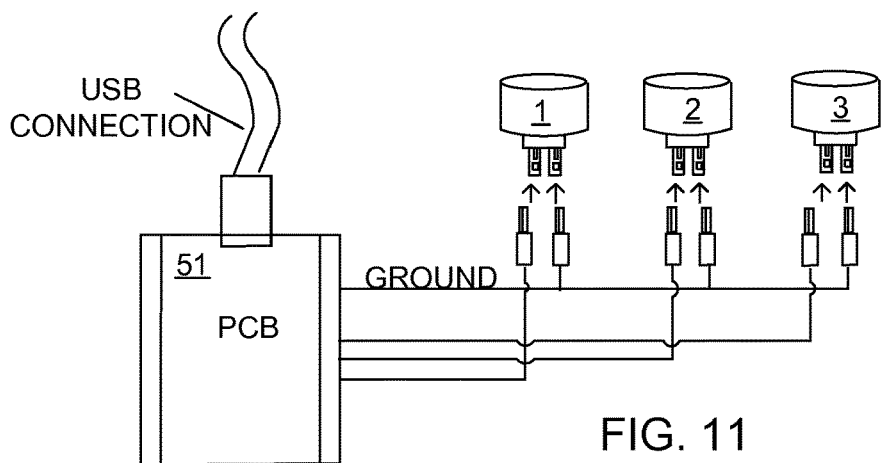
Figure 13:
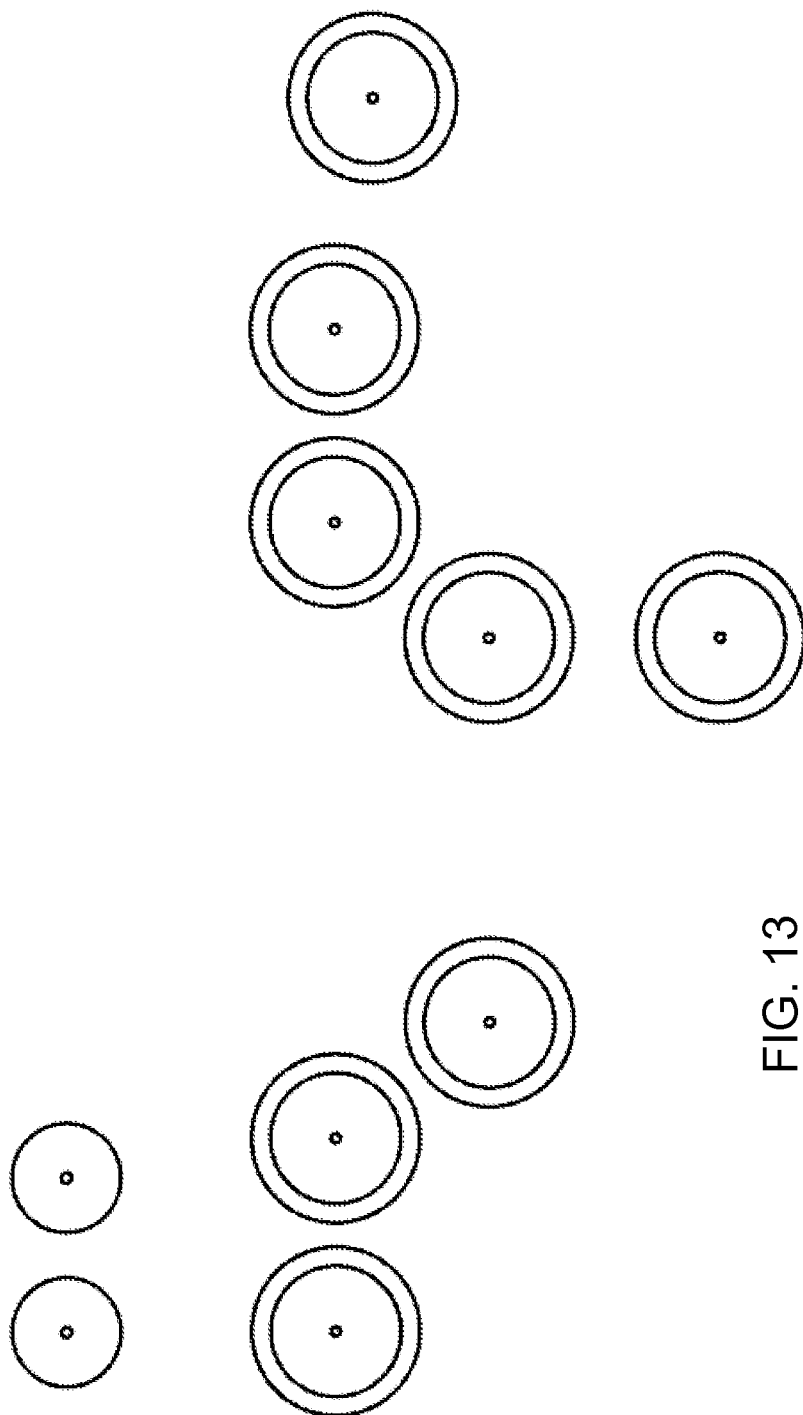
Figure 14:
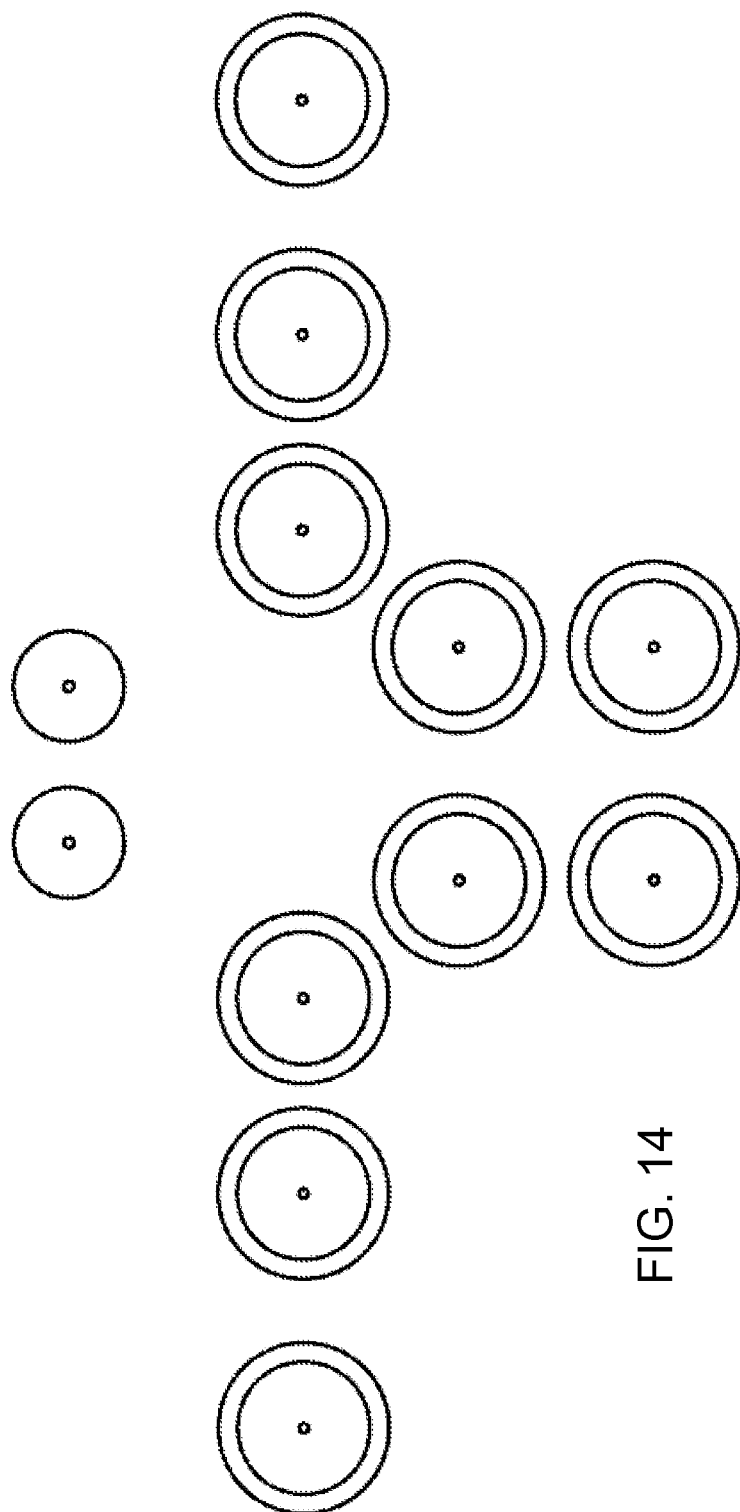
Figure 15:
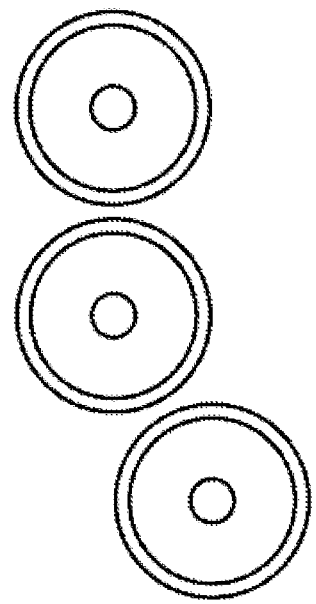
Figure 15:
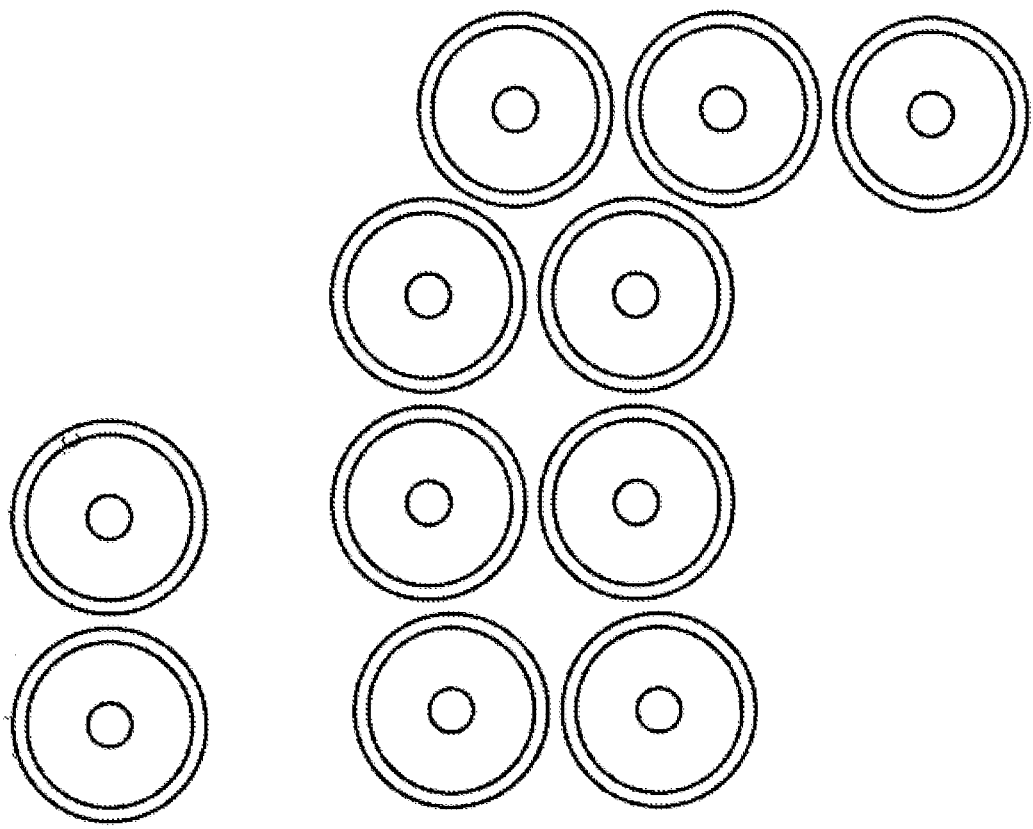
Figure 16:
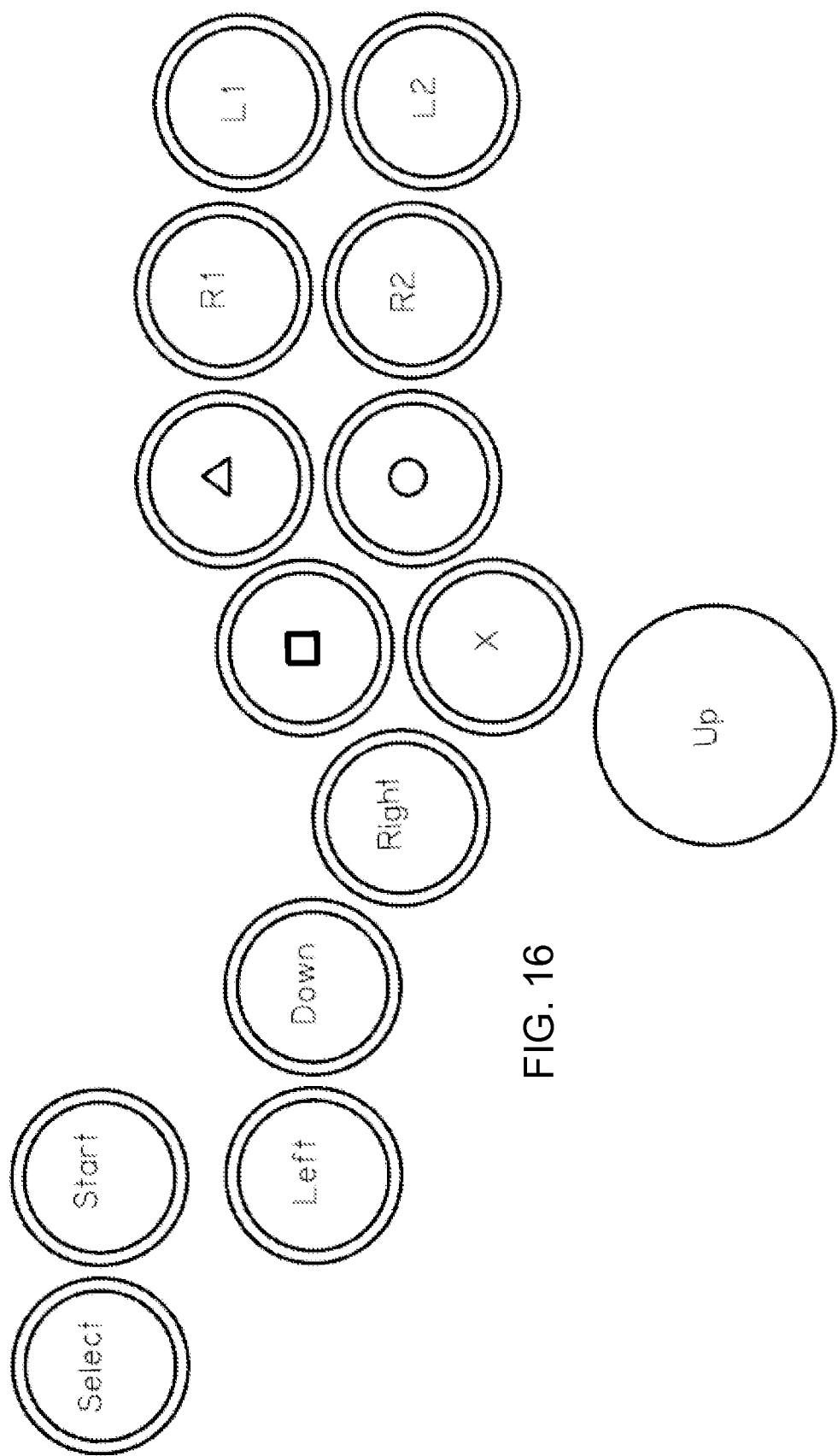
Figure 17:
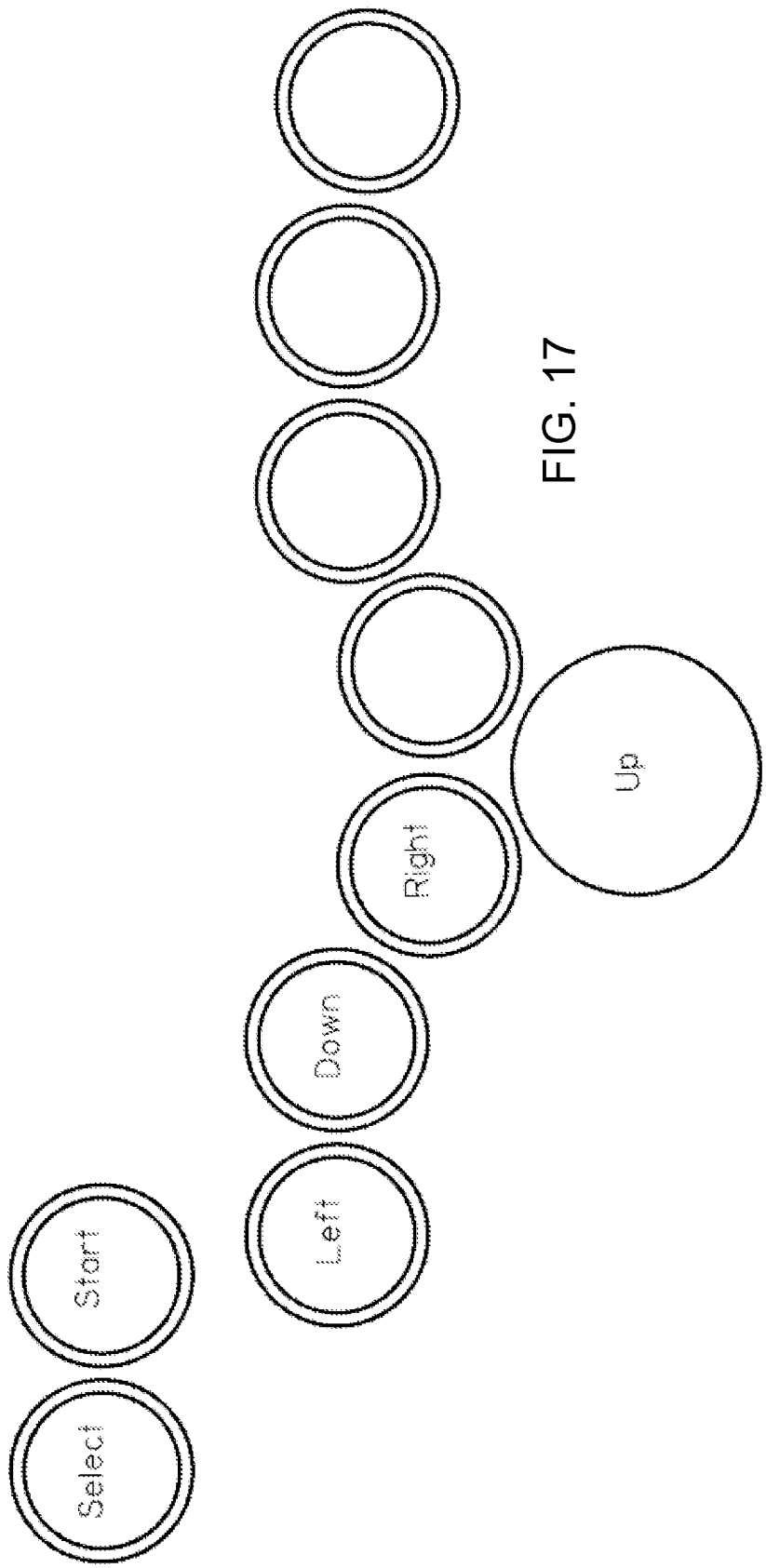
Figure 18:
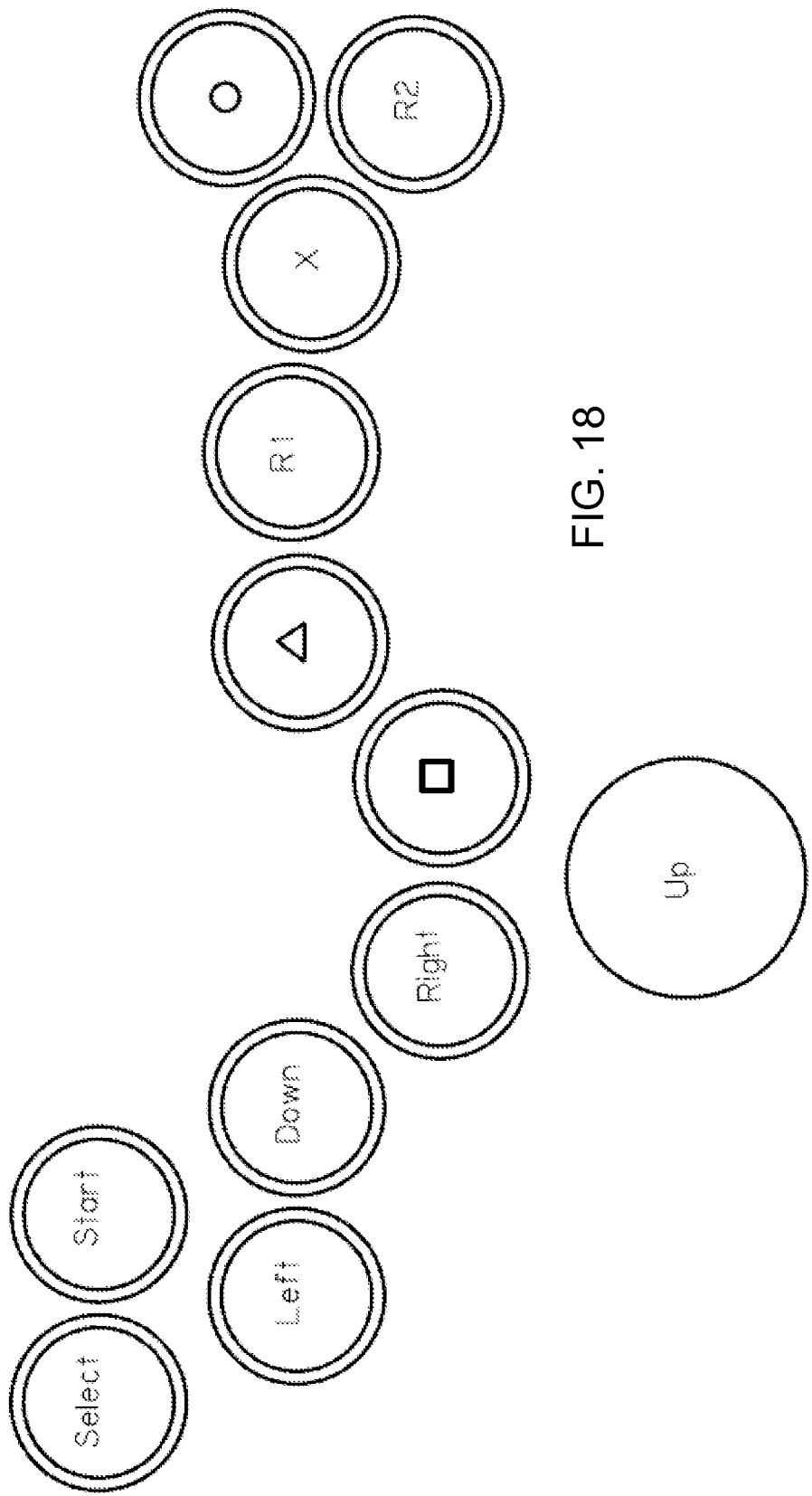

FIG. 9 shows a front view of controller 20 shown in FIG. 2. FIG. 10 shows a front see-through view of the embodiment of FIG. 9. In FIGS. 10 and 11, the wiring details are displayed. FIGS. 10 and 11 show the printed circuit board (PCB) 51. In an embodiment, PCB 51 is printed circuit board model no. PS360 manufactured by Akishop Corp. The PS360 PCB is an aftermarket printed circuit board which allows a user to interface with a Sony Playstation® console and an XBOX 360® console. XBOX 360® is a registered trademark of the Microsoft Corporation and refers in general to interactive game consoles. Wiring runs from the appropriate pin connections of PCB 51 to the buttons 1-15 as shown.

FIGS. 12-18 show several alternate embodiments where the position of the buttons has been modified relative to each other. However, in each embodiment, the position of the buttons is arranged so that the position of the buttons matches the position of the user's fingers in a fashion similar to that shown above in reference to FIGS. 3 and 4.

Figure 19:
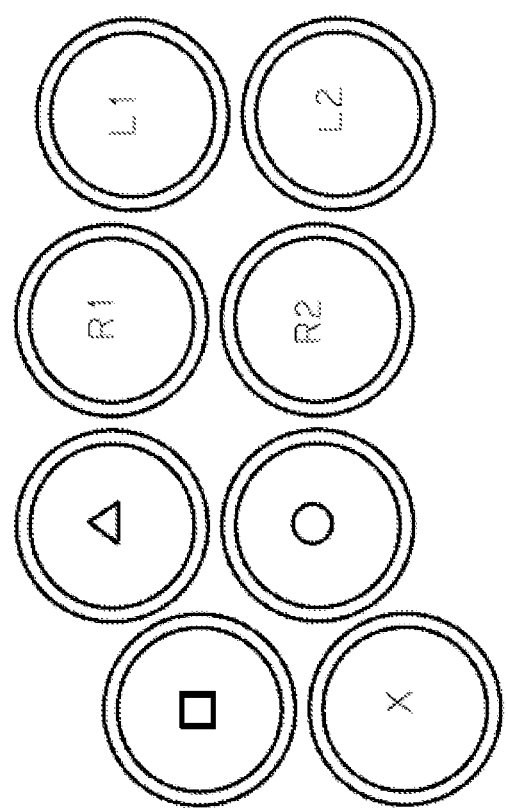
Figure 19:
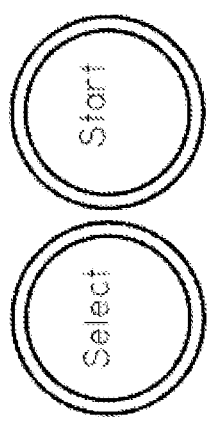
Figure 19:
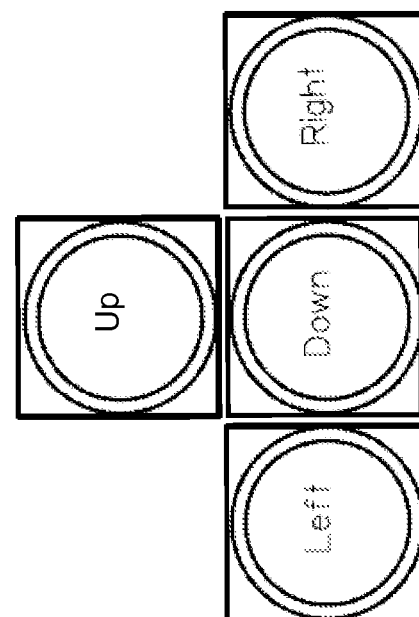
Figure 20:
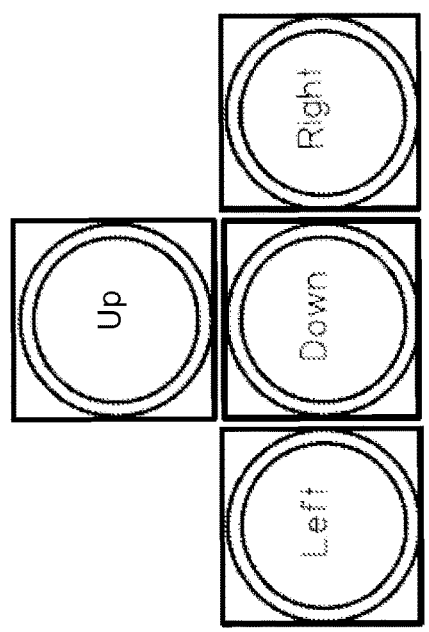
Figure 20:
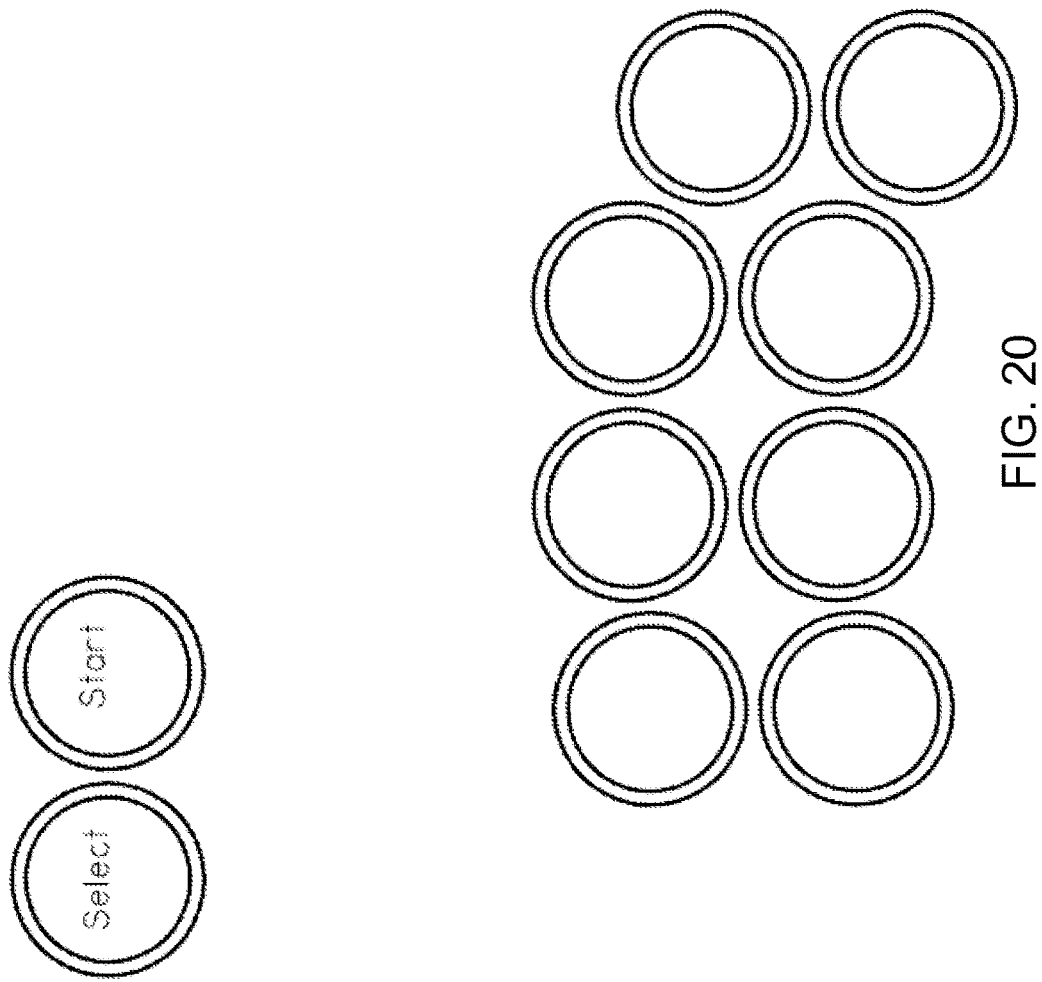

FIGS. 19 and 20 show alternate embodiments where the buttons for one hand are configured to match the natural arrangement of the user's fingers. In FIG. 19 the left hand controls buttons configured similar to the up, down, left and right arrows of a keyboard. In FIG. 20 the right hand controls buttons configured similar to the up, down, left and right arrows of a keyboard. FIGS. 19 and 20 show controllers that are preferable for gamers who are used to the up, down, left and right arrows of a keyboard.

The embodiments of the present invention use smaller buttons than a traditional common joystick. These buttons create a more ergonomic layout for the human hand. The embodiments are modeled after the curvature of the human hand so as to greatly reduce stress over time to reduce repetitive strain injuries (RSI's). They also eliminate the need to hover the hand around searching for buttons in game, and have all buttons instantly accessible to the hands.

As shown above, there are several embodiments. All are closely related in design, but have differences in button placement and button quantity.

One feature shown in FIG. 2 is the directional button inputs. "Left," "Right," and "Down" are controlled by the left hand, while the final direction "Up" is controlled by the right thumb. This unique placement of "Up" allows greater ease in performing advanced techniques in fighting games. It also eliminates the common mistake of accidental "Up" inputs.

Other embodiments of the present invention place the important "Up" button on the left thumb in an ergonomic curvature of the human hand.

Some of the embodiments use larger standard-sized 30 mm arcade pushbuttons.

As shown above, electrical wire connects the arcade pushbuttons to the controller's circuit board. Specifically, the directional input pushbuttons are linked to the corresponding directions on the circuit board.

The present invention is an instrument designed preferably for fighting video games. Its advantages can be appreciated by the beginning player through the champion tournament player. It is designed for gamers all across the globe.

It should be noted that although the figures show a modification of a Sony Playstation® game controller, it should be understood that a PCB of any existing game controller can be substituted for PCB 51. Some of the existing game controller PCBs that can be utilized include (but are not limited to): the Xbox® controller, the Xbox 360®, Sony Playstation® 2, Sony Playstation® 3, the Nintendo Gamecube®, controller boards and kits such as the Toodles Cthulhu for Multi-Console, any existing joystick or alternative brand controller, and many more. To modify controller 101, the printed circuit board of the prior art controller of interest is inserted into controller 101 in place of PCB 51. For example to create a controller for Nintendo Gamecube® the PCB from the Nintendo Gamecube® is removed and placed in controller 101 in place of PCB 51.

There are several sub categories in models of game controllers as well. For example, Sony Playstation® game controller Playstation 1 Digital H is different in structure than Playstation 1 Dual Shock A (Late Version), but follow the same principles. Also, it should be understood that the present invention can be fabricated as a stand alone item. For example, a new controller (not tied to an existing game unit) can be built using the principles disclosed above. It is only important that both hands are able to comfortably reach and control the push buttons in a fashion similar to that described above and that the directional buttons are controlled by the fingers.

Figure 21:
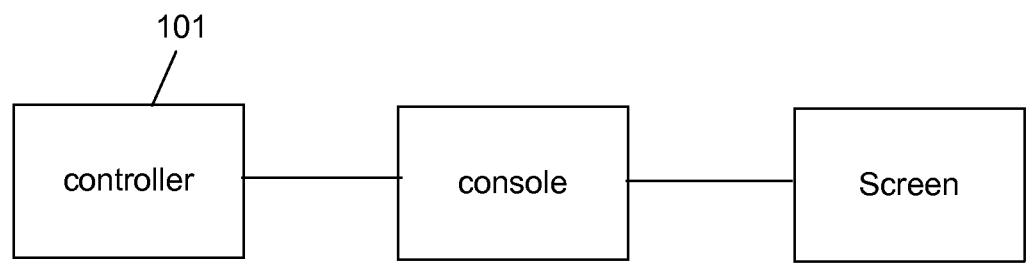
FIG. 21 shows a wire connection between a controller and a console.
Figure 22:
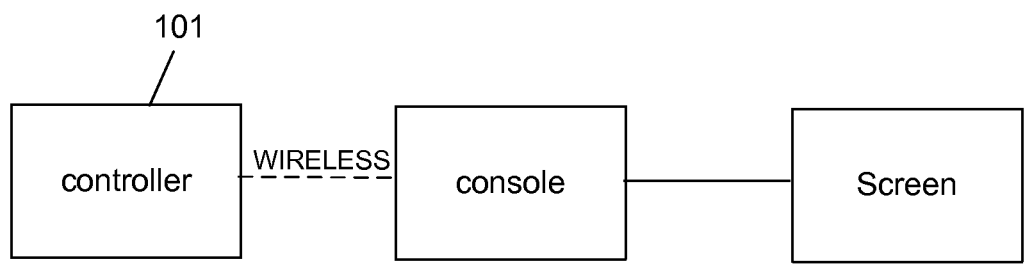
FIG. 22 shows a wireless connection between a controller and a console.

It should be noted that it is possible for controller 101 to be connected to console via a wire connection (such as a USB cable shown in FIG. 21) or via a wireless connection (FIG. 22).

Although the above-disclosed embodiments have been described with specificity, persons skilled in this art will recognize that many changes to the specific embodiments disclosed above could be made without departing from the spirit of the invention. For example, although FIG. 2 shows button 15 on the left side of controller 20, it can be easily moved so that it is adjacent buttons 13 and 14. It should be noted that in the embodiments the buttons of ergonomic relevance are buttons 1-12, and buttons 13-15 are merely utility buttons. Therefore, the attached claims and their legal equivalents should determine the scope of the invention.

What is claimed is:

1. A hand-operated game controller for controlling a game comprising:
    a game controller surface extending horizontally between a left edge and a right edge and vertically between a top edge and a bottom edge;
    a first assemblage of buttons arranged along a first arcuate shape extending from a right most point to a left most point, wherein the left most point of the first arcuate shape is closer to the bottom edge of the game controller surface than the right most point of the first arcuate shape is to the bottom edge;
    a second assemblage of buttons arranged along a second arcuate shape, wherein a left most point of the second arcuate shape is closer to the bottom edge than the left most point of the first arcuate shape is to the bottom edge; and
    a third assemblage of buttons of at least four adjacently positioned buttons having a center button located closer to the left edge than the right edge of the game controller surface, a left button closer to the left edge than the center button, a right button closer to the right edge than the center button, and a top button closer to the top edge than the center button.

2. The hand-operated game controller of claim 1, wherein the third assemblage of buttons are associated with directional functions when controlling the game.

3. The hand-operated game controller of claim 1, wherein the center button of the third assemblage of buttons, the top button of the third assemblage of buttons, the left button of the third assemblage of buttons, and the right button of the third assemblage of buttons are rectangular shaped with rounded edges.

4. The hand-operated game controller of claim 1, wherein a right most edge of the first arcuate shape and a left most edge of the first arcuate shape is closer to the bottom edge than an apex of the first arcuate shape.

5. The hand-operated game controller of claim 1, wherein the first assemblage of buttons and the second assemblage of buttons provide functional inputs when controlling the game.

6. The hand-operated game controller of claim 1, further comprising a fourth assemblage of at least two buttons arranged along a horizontal straight line, wherein the fourth assemblage of buttons is closer to the top edge than the first assemblage of buttons and the third assemblage of buttons.

7. The hand-operated game controller of claim 6, wherein the fourth assemblage of buttons provides access to, and navigation within, menus when controlling the game.

8. The hand-operated game controller of claim 1, wherein the buttons of the first assemblage of buttons and the second assemblage of buttons are round.

9. The hand-operated game controller of claim 1, wherein the first assemblage of buttons and the third assemblage of buttons do not intersect with a central line extending vertically halfway between the right edge and left edge of the game controller surface.

10. The hand-operated game controller of claim 2, wherein the top button of the third assemblage of buttons is associated with an up direction, the center button of the third assemblage of buttons is associated with a down direction, the left button of the third assemblage of buttons is associated with a left direction, and the right button of the third assemblage of buttons is associated with a right direction.

11. A hand-operated game controller for controlling a game comprising:
   a game controller surface extending horizontally between a left edge and a right edge and vertically between a top edge and a bottom edge;
   a first assemblage of buttons arranged along a first arcuate shape extending from a right most point to a left most point, wherein the left most point of the first arcuate shape is closer to the bottom edge and left edge of the game controller surface than the right most point of the first arcuate shape is to the bottom edge;
   a second assemblage of buttons arranged along a second arcuate shape, wherein a left most point of the second arcuate shape is closer to the bottom edge than the left most point of the first arcuate shape and the right most point of the first arcuate shape;
   a third assemblage of buttons of at least four adjacently positioned buttons having a center button located closer to the left edge than the right edge of the game controller surface, a left button closer to the left edge than the center button, a right button closer to the right edge than the center button, and a top button closer to the top edge than the center button; and
   a fourth assemblage of at least two buttons arranged linearly, wherein the fourth assemblage of buttons is closer to the top edge than the first assemblage of buttons.

12. The hand-operated game controller of claim 11, wherein the fourth assemblage of buttons provide access to, and navigation within, menus when controlling the game.

13. The hand-operated game controller of claim 11, wherein the top button of the third assemblage of buttons is associated with an up direction, the center button of the third assemblage of buttons is associated with a down direction, the left button of the third assemblage of buttons is associated with a left direction, and the right button of the third assemblage of buttons is associated with a right direction.

14. The hand-operated game controller of claim 11, wherein the center button of the third assemblage of buttons, the top button of the third assemblage of buttons, the left button of the third assemblage of buttons, and the right button of the third assemblage of buttons are rectangular shaped with rounded edges.

15. A hand-operated game controller for controlling a game comprising:
   a game controller surface extending horizontally between a left edge and a right edge and vertically between a top edge and a bottom edge;
   a first assemblage of buttons including a row of at least three buttons arranged along a first arcuate shape extending from a right most point to a left most point, wherein the right most point of the first arcuate shape is closer to the right edge of the game controller surface than the left edge of the game controller surface and wherein the left most point of the first arcuate shape is closer to the bottom edge and left edge of the game controller surface than the right most point of the first arcuate shape is to the bottom edge and the left edge;
   a second assemblage of at least three buttons arranged along a second arcuate shape, wherein a left most point of the second arcuate shape and a right most point of the second arcuate shape are closer to the bottom edge than the left most point of the first arcuate shape and the right most point of the first arcuate shape; and
   a third assemblage of buttons of at least four adjacently positioned buttons having a center button located closer to the left edge than the right edge, a left button closer to the left edge than the center button, a right button closer to the right edge than the center button, and a top button closer to the top edge than the center button, wherein the third assemblage of buttons are associated with directional functions when controlling the game.

16. The hand-operated game controller of claim 15, wherein the center button of the third assemblage of buttons, the top button of the third assemblage of buttons, the left button of the third assemblage of buttons, and the right button of the third assemblage of buttons are rectangular shaped with rounded corners.

17. The hand-operated game controller of claim 16, further comprising a fourth assemblage of at least two buttons arranged along a horizontal straight line, wherein the fourth assemblage of buttons is closer to the top edge than the first assemblage of buttons and the third assemblage of buttons.

18. The hand-operated game controller of claim 17, wherein the buttons of the first assemblage of buttons and the second assemblage of buttons are round.

19. The hand-operated game controller of claim 18, wherein the first assemblage of buttons and the third assemblage of buttons do not intersect with a central line extending vertically halfway between the right edge and left edge of the game controller surface.

20. The hand-operated game controller of claim 19, wherein a right most edge of the first arcuate shape and a left most edge of the first arcuate shape is closer to the bottom edge than an apex of the first arcuate shape.

\* \* \* \* \*